United States Patent [19]
Opitz

[11] 3,802,173
[45] Apr. 9, 1974

[54] MOWING AND BAGGING MACHINE
[76] Inventor: Eric J. Opitz, 4830 W. Bancroft St., Franklin, Mich. 43615
[22] Filed: Jan. 24, 1972
[21] Appl. No.: 220,105

[52] U.S. Cl.......................... 56/202, 15/79, 56/12.2, 56/17.2, 280/43
[51] Int. Cl............................................ A01d 53/06
[58] Field of Search.......... 56/12.2, 16.6, 17.2, 202, 56/194; 15/79; 280/43

[56] References Cited
UNITED STATES PATENTS

| | | | |
|---|---|---|---|
| 3,199,277 | 8/1965 | Moody | 56/16.6 |
| 3,624,989 | 12/1971 | Gatheridge | 56/202 |
| 3,664,099 | 5/1972 | Chouniard | 56/13.3 |
| 2,794,308 | 6/1957 | Cavanaugh | 56/17.2 |
| 1,482,954 | 2/1924 | Tideman | 280/43 UX |
| 2,719,396 | 10/1955 | Morris et al. | 56/12.2 |
| 2,882,668 | 4/1959 | Murillo | 56/202 X |
| 2,564,201 | 8/1951 | Hainke | 56/17.2 X |
| 2,763,116 | 9/1956 | Flinchbaugh et al. | 56/17.2 X |
| 2,879,074 | 3/1959 | Roberton et al. | 280/43 |
| 3,147,987 | 9/1964 | Ritums | 56/17.2 X |

Primary Examiner—Robert Peshock
Attorney, Agent, or Firm—George A. Schmidt

[57] ABSTRACT

A lawn care machine of the rotary power mower type having a chute for receiving and conveying cuttings and/or sweepings upwardly and rearwardly for discharge and compacting into a disposable or non-disposable air porous and debris retaining bag. A bag support assembly located rearwardly of the machine, permits rearward removal of the bag without obstruction and with minimal lifting. The machine includes four supporting wheels disposed at three-point location, the rear wheels being within the cutting swath of the mower blade and a forward caster wheel assembly permitting great maneuverability. The supporting wheels are adjustable to vary the cutting height.

25 Claims, 10 Drawing Figures

MOWING AND BAGGING MACHINE

SPECIFICATION

This invention relates to a lawn care machine of the rotary power mower type, and more particularly to a machine that mows and/or sweeps and conveys cuttings or sweepings through a chute for downward and rearward compacting discharge into a disposable bag.

In the art of lawn care, it is necessary at various times of the year to cut grass or pick up leaves for lawn maintenance. The use of power driven machines for these purposes is becoming increasingly popular, and the rotary mower is often used for both of these functions. Collection and discard of cuttings or sweepings is an ever present problem with the usual machine used for these purposes.

The readily available mowing machines usually include a side discharge assembly, wherein cuttings or sweepings are discharged into a bag mounted at the side of the machine. The usual bag assembly is cumbersome to work with and must constantly be removed from the machine for emptying into yet another container for disposal of cuttings or sweepings. The discharge bag must then be replaced on the machine before continuing use. Removal, emptying, and replacement are time consuming tasks and often difficult, particularly for the elderly or infirm who may be unable to lift to the degree required. Further, when the usual side discharge bags are emptied into refuse containers, a large number of such containers is necessary. These are difficult to work with and must constantly be transported from place to place.

Yet, another difficulty with the usual power mower is the wheel location and adjustment. Most such mowers have four supporting wheels located at spaced points about the mower housing. Such location makes the mowing or sweeping operation difficult, particularly where mowing or sweeping must take place about oddly shaped flower beds, trees, walls, or other obstructions. Still another difficulty with presently available machines is the ease with which the height of the machine or cutting blade above the ground may be adjusted. Most such machines have adjustment mechanisms which are complicated and cumbersome to operate, which require close operation within the wheel assemblies and much difficulty in assuring equal adjustment on all wheels.

A further shortcoming with most available power driven machines is in the exhaust treatment of the internal combustion engine that powers such machines. The normal exhaust treatment is to provide a small muffler on the end of the engine exhaust pipe and then discharge to the atmosphere, with the consequent noise and pollutant problems arising from such discharge.

The machine in which this invention is embodied comprises, generally, a lawn care machine of the rotary power mower type including a wheeled housing having an engine mounted thereon, and a shaft extending through the housing to receive a cutting or sweeping blade therebeneath. A convoluted chute extends upwardly and rearwardly of the housing to a discharge terminus, directing air flow, cuttings and sweepings in a downward direction rearwardly of the machine. A bag support assembly is mounted rearwardly of the housing and receives a bag into which cuttings or sweepings are discharged and compacted. The bag support assembly is so constructed as to have rearward unobstructed removal of the filled and compacted bag, and a cover assembly extends over the top of the chute terminus and the bag support assembly. The supporting wheels are adjustably mounted on the housing, the forward wheel assembly being a caster assembly with two wheels in closely spaced relation. The driving engine discharges exhaust into a chamber, and a nozzled exhaust conduit extends from the chamber and discharges into the upwardly directed chute. A handle assembly, pivotally mounted on the housing directs the motion of the machine and is pivotable upwardly and forwardly to permit unobstructed rearward removal of a filled bag.

A machine so designed and constructed provides many advantages over machines presently known in the art. The mowing and bagging machine is a single device adapted to mow, sweep, lift, bag and compact cuttings and sweepings with a single passage over the lawn, and the removal of loaded bags is extremely simple with a minimum of exertion on the part of the operator by simply raising the handle and disconnecting the bag, the compacted bag may be easily removed rearwardly of the machine and left in place for later disposal. The three-point wheel location and the location of the rearward wheels within the cutting swath of the blade, make the machine extremely maneuverable, readily able to turn corners or steer around curves, and provides ease and efficiency in mowing adjacent to and around trees, garden beds and other obstructions. The wheel assemblies are such as to make height adjustment a simple matter, without great complexity or guesswork and the proper cutting height is thus easily maintained. The engine exhaust, being discharged into the chute through a chamber, not only assists in upward flow of air through the chute to the rearward discharge, but also muffles the exhaust gases. Further, by comingling gases with the cuttings or sweepings a great deal of the pollution problem which presently exists in power operated mowers is eliminated.

These and other advantages will become more apparent from the following description, used to illustrate preferred embodiments of the invention, when taken with the accompanying drawings in which.

Referring more particularly to the drawings, where the various showings are for purposes of illustrating preferred embodiments of the invention only and not for purposes of limiting same, FIGS. 1 – 4 best illustrate the basic mowing and bagging machine.

Figure 4:
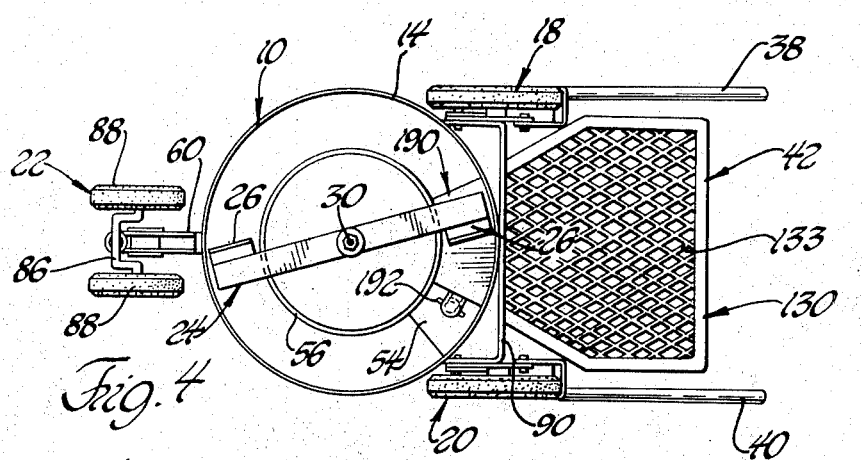
FIG. 4 is a bottom plan view of the machine illustrated in FIGS. 1 through 3.

A substantially cylindrical housing, indicated generally by the numeral 10, includes an upper wall 12 from which depends a skirt 14. Housing 10 is supported from the ground 16 by rear wheel assemblies, indicated generally by the numerals 18 and 20, and a forward caster wheel assembly, indicated generally by the numeral 22. As indicated in FIG. 4, a blade, indicated generally by the numeral 24, is mounted for rotation within the housing and contains blade elements 26 adapted to cut grass, leaves, or other such objects on the lawn surface 16. Secured to the upper wall 12 of the housing 10 is an internal combustion engine or the like 28, having a central shaft 30 extending downwardly through the housing wall 12 and receiving the blade 24.

Figure 3:
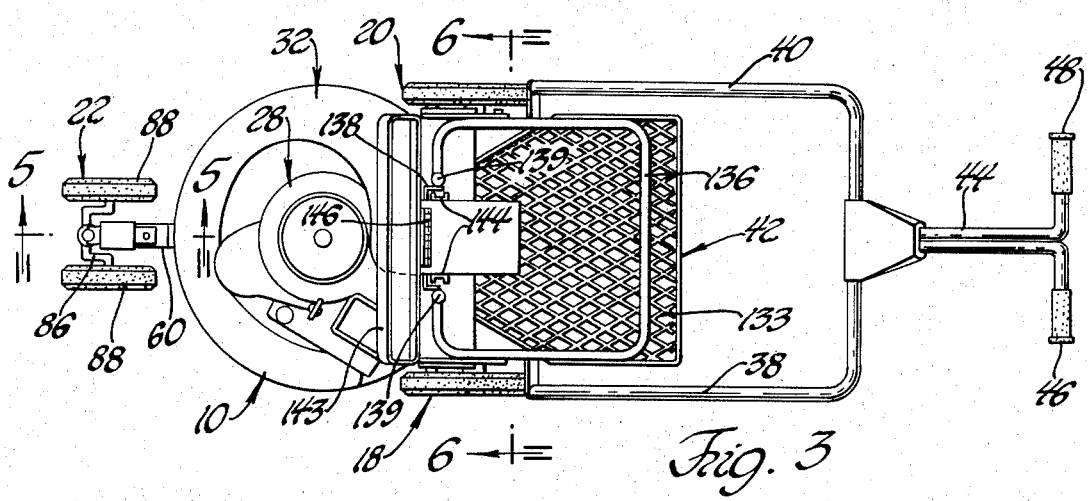
FIG. 3 is a top plan view of the machine illustrated in FIGS. 1 and 2.

Convoluting upwardly around the engine 28 from the housing 10 is a chute, indicated generally by the numeral 32, having a rearward discharge terminus 34. Secured to the rearward portion of housing 10 is a handle assembly, indicated generally by the numeral 36, pivotable in a manner to be hereinafter more particularly described. Handle 36 is U-shaped, as best illustrated in FIG. 3, having legs 38 and 40 straddling a bag support assembly, indicated generally by the numeral 42. Bag support assembly 42 is secured to the housing 10, as will be later described, and extends upwardly to enclose the discharge end 34 of the chute 32. Legs 38 and 40 of the handle assembly 36 extend upward, as at 44 and then outward, as at 46 and 48, to provide handle means for the operator.

Housing 10, when viewed from the underside as in FIG. 4, has a circular channel 50 forming the upper wall of the chute 32, beginning at a low point at 52 and increasing in height as it circles around the housing 10 to the upwardly directed portion 54 of the chute 32. The central portion 12 of the housing 10 is generally planer and supports the engine assembly 28 on the top surface of the housing 10. A cylindrical wall 56, secured in any suitable manner to the housing 10, defines the inner wall of the chute 32 beneath the housing surface 12.

The formation of blade 24 and blade elements 26 are such as to create an air flow around the chute and upwardly, to pick up grass clippings or sweepings as the machine is used. The chute shape and construction are such as to carry such sweepings or cuttings upwardly to the discharge terminus 34 for discharge, as will be hereinafter more particularly described.

Figure 5:
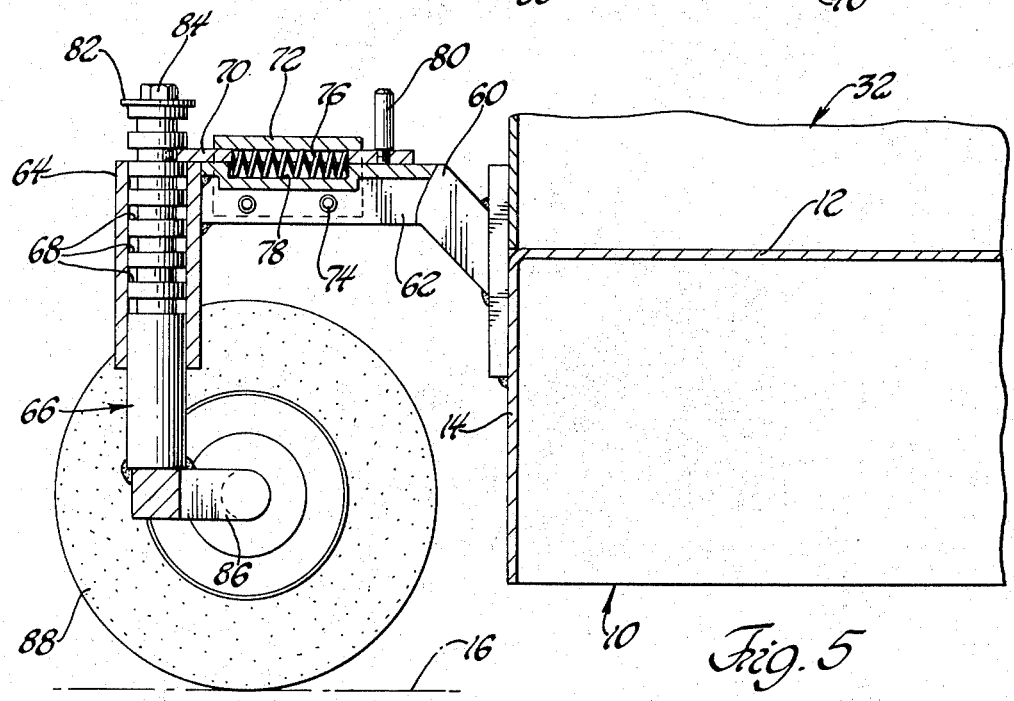
FIG. 5 is an enlarged elevational view, with parts broken away and in section, of a portion of the machine illustrated in FIGS. 1 through 4, taken substantially along the line 5—5 of FIG. 3 and looking in the direction of the arrows.

With reference now to FIG. 5 the forward end of the housing 10 has secured thereto a bracket assembly, indicated generally by the numeral 60. Bracket assembly 60 has a portion 62 extending horizontally and forwardly and has secured on the end thereof a generally vertical sleeve 64. Slidably and rotatably disposed within the sleeve 64 is a shaft, indicated generally by the numeral 66, the shaft having a plurality of annular grooves 68 formed in the portion thereof disposed within the sleeve 64. An adjustment slide member 70 is received on top of the bracket portion 62 and is slidable thereon so that the outer end may be received in any one of the grooves 68. A cover plate 72, secured in any suitable manner as by bolts 74 to the bracket portion 62, encloses a portion of the slide member 70 and encloses a biasing spring 76 disposed in a slot 78 in the slide member 70, biasing the member 70 into one of the annular grooves 68 in the shaft 66. A pin 80 is secured on the rearward end of the slidable adjustment member 70 in any suitable manner to provide a means for the operator to slide the member 70 as desired. It will be apparent that, as the shaft 66 is slidable and rotatable in the sleeve 64, the position of the shaft relative to the sleeve may be adjusted by disengaging the adjustment member 70 from one groove 68 and re-engaging the member 70 in another suitable groove for proper adjustment relative to the ground. To prevent the shaft 66 from disengaging completely from the sleeve 64, an enlarged washer 82 is secured on the top of the shaft 66 in any suitable manner, as by bolt 84. Washer 82 is of such dimension as to engage the end surface of the sleeve 64 and prevent complete removal of the shaft 66.

Disposed at the lower end of shaft 66 is an axle 86, which extends in opposite directions from the shaft 66. On each end of axle 86 is disposed a wheel 88 in any manner well known in the art. It will be apparent that the wheels 88 and axle 86 will rotate about the center line of shaft 66 within the sleeve 64. The spacing of wheels 88 provides a degree of stability at the forward end of the machine and the rotating action about the center line of the sleeve 64 provides great maneuverability for the machine in steering around obstacles.

Figure 9:
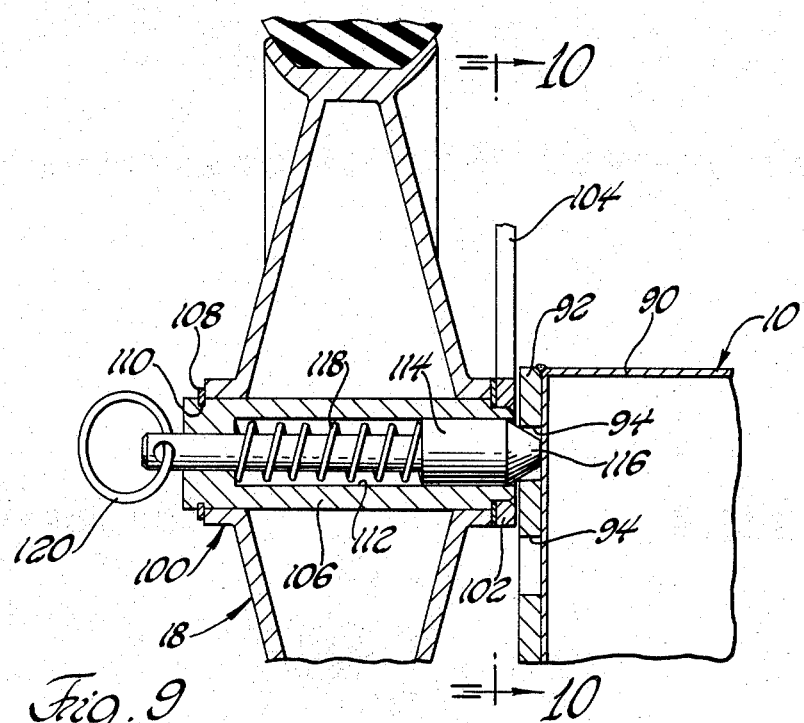
FIG. 9 is an enlarged cross-sectional view of a portion of the machine illustrated in FIGS. 1 - 6, showing the rear axle assembly.
Figure 10:
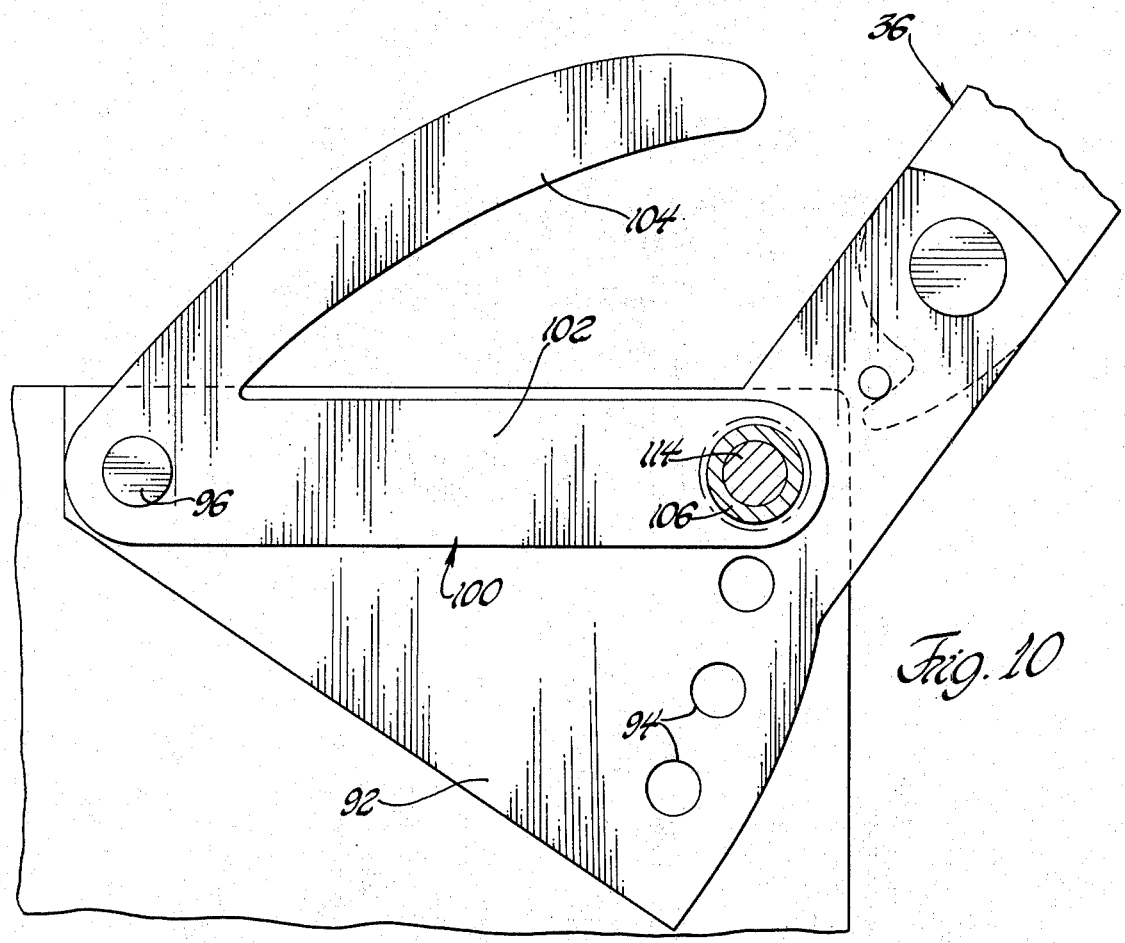
FIG. 10 is an enlarged view of a portion of the machine illustrated in FIGS. 1 – 6, showing yet another part of the rear wheel adjustment assembly.

The rearward portion of the housing 10 includes a generally rectangular section 90 which supports the rear wheel assemblies 18 and 20, the bag support assembly 42 and the handle assembly 36. As best illustrated in FIGS. 9 and 10, a plate member 92 is suitably secured at each side of the rearward portion 90 of the housing 12, each such plate member being provided with a series of holes 94 disposed on an arc of a circle about a point 96 on the plate member 92. Pivotally mounted on the plate member 92 and at the point 96 is a rear wheel axle assembly, indicated generally by the numeral 100. Each axle assembly 100 includes a plate portion 102 and a flag portion 104, the purpose for which will become hereinafter more apparent. Extending outwardly from the plate portion 102 and in the vicinity of the apertures 94 in the plate 92 is an axle shaft 106 which receives the rear wheel 18 in a manner well known in the art. A retaining ring or the like 108, suitably received in a groove 110 in the axle shaft 106, retains the wheel hub on the axle 106 in the manner well known in the art. Within the axle shaft 106 is a cylindrical bore 112, receiving a shot pin 114 which extends through the axle shaft 106 and has a truncated conical end 116 receivable in any one of the apertures 94 in the plate 92. A spring 118, also disposed in the bore 112, biases the shot pin 114 in the direction of the plate 92 and the end of the shot pin 116 into one of the apertures 94. A ring or the like 120, received through an aperture 122 in the outward end of the shot pin 114, provides a means by which the shot pin may be manually withdrawn from any one aperture 94. The entire axle assembly may then be pivoted about the point 96 so that the end 116 of the shot pin 114 will be received in another aperture 94, thus changing the position of the wheel 18 relative to the housing 12.

As there is a like assembly at the opposite side of the housing 12, the flag portions 104 of the respective plate portions 102 will indicate to the operator the position of the plate member 102 and axle assembly 100 relative to the fixed plates 92 and the housing 12. In such manner the operator can quickly and easily determine whether the two rear wheels are equally positioned relative to the housing 10.

Also mounted on the rearward portion 90 of the housing 10 is the bag support assembly, one modification being illustrated generally at 42 in FIGS. 1 through 4. A base support platform 130 is secured in any suitable manner to the rearward portion of the housing 10 and includes an upwardly directed rearward part 132, so disposed that the entire machine may be tipped downwardly and rearwardly by the operator, should such be necessary or desirable, without interference of the rearward portion 132 with the ground. A mesh screen or the like 133 is secured within the base frame 130 to provide a bag support platform, as will become hereinafter more apparent.

Extending upwardly from the support member 130 are spaced vertical side elements 134 which in turn help support the upper bag support frame 136. Frame 136 is secured in any suitable manner to the upper ends of the vertical elements 134 and is secured by bracket members 138 to the upper portion of the chute 32. Upper frame 136 is generally rectangular in shape and provided with an opening at the portion above the end 34 of the chute 32. Suitable knobs 139 are secured on the open ends of the frame member 136 for purposes to become hereinafter more apparent. Extending from the side elements 134 and forwardly toward the chute 32 is a screen or mesh element 142 which serves to support the bag as it is filled, as will become hereinafter more apparent. A cover member 143 is hinged, as at 146, to the upper surface of the chute 32 and covers the bag support frame 136 in its downward position.

Located at each side and around the bottom of the rearward end of the chute 32 is a channel member 144. A bag, indicated by the numeral 140, is received in the bag support assembly 42, to in turn receive the sweepings or clippings discharged from the chute 32 after cutting by the blade 24. Bag 140 may be formed of any suitable material that will permit air flow therethrough but will generally retain debris within the bag 140. As an example, a perforated plastic bag may be used, wherein the perforations are of such size as to permit air to pass outwardly but do not permit cuttings or sweepings to pass. Other materials may be used, whether of a plastic or other material, so long as air flow from the pressurized bag is obtained without discharge of debris. The bag may be either disposable or non-disposable.

Figure 1:
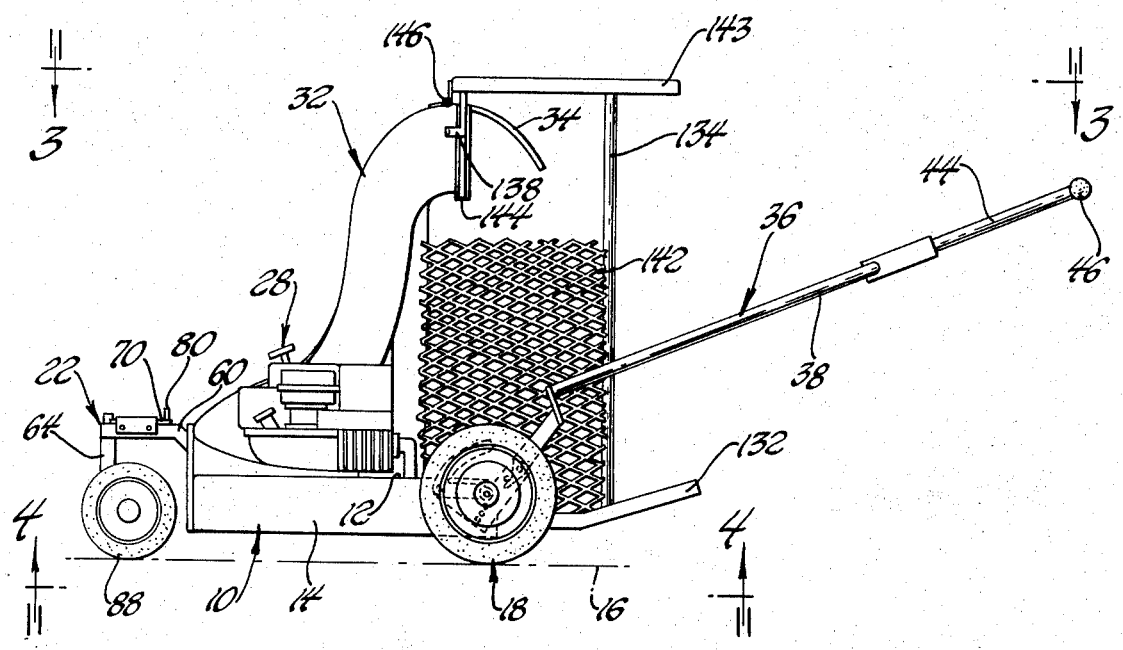
FIG. 1 is a side elevational view of a mowing and bagging machine embodying the present invention.

The bag is so designed as to have an opening circumference substantially equal to the periphery of the upper support frame 136 plus twice the dimension of the distance from the frame 136 to the bottom surface of the rearward portion of the chute 32. With such dimensions, the bag may be mounted in the bag support assembly 42 by the operator facing forwardly from the rear of the machine, gathering a portion of the bag at the opening and disposing the same in the channel 144 around the chute 32. The operator then brings the opening of the bag upwardly and inwardly around the knobs 139 at the exposed ends of the frame 136 and entrains the bag over the top of the frame 136. A reverse fold of several inches of the bag over the frame 136 is sufficient to hold the bag in place in the position best shown in FIG. 2. The bag then depends from the frame 136 to the base support frame 130 and as the bag is filled with discharge from the chute 32, the lower support 134 and the side support 142 hold the bag in its upright position. With the cover 143 in the downward position, as illustrated in FIG. 1, the top of the bag is covered to prevent blowby and stray discharge from the top of the bag.

Figure 7:
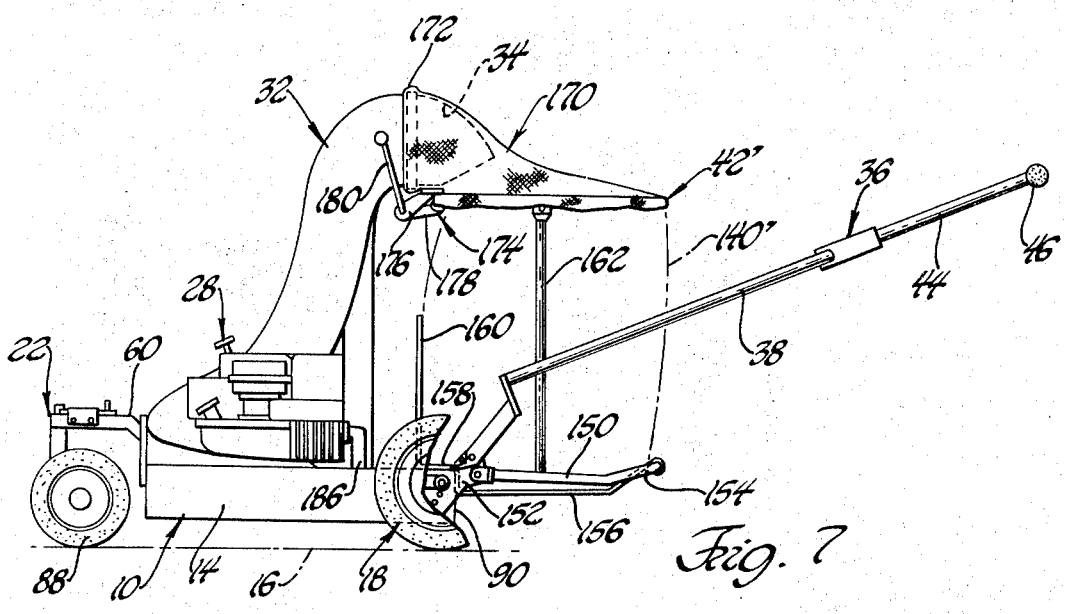
FIG. 7 is a side elevational view of a mowing and bagging machine embodying the invention and illustrating a modification of the bag support assembly.
Figure 8:
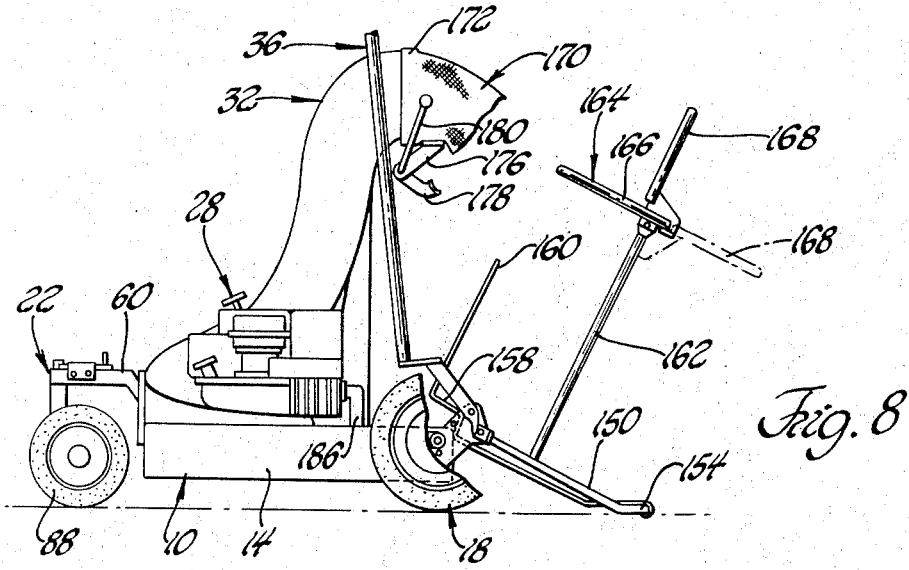
FIG. 8 is a view similar to FIG. 7, illustrating parts of the bag assembly in a second position.

With reference now to FIGS. 7 and 8, a modification of the bag support assembly is illustrated and indicated generally by the numeral 42'. A lower support frame 150 is pivotally secured to a support 152, which in turn is rigidly secured to the rearward portion 90 of the housing 10 in any suitable manner. Frame 150 is generally rectangular in shape, extending rearwardly from the housing 10 to a like support member 152 at the opposite side of the housing 10. Frame 150 is provided with an upwardly and rearwardly directed portion 154 to permit downward and rearward tipping of the machine as heretofore described. A lower bag support element 156 is secured at the rearward portion of the frame 150, extending forwardly therefrom to the rearward portion 90 of the housing 10 where the element 156 is then bent upwardly and then again forwardly as at 158 to rest upon the housing 10. The element 156 is then bent upwardly, as at 160, to provide a forward support for the bag 140' received in the assembly 42'.

Extending upwardly from the lower frame member 150 are spaced vertical side elements 162 which support the upper frame structure 164. Upper frame structure 164 includes a first portion 166 rigidly secured to the side elements 162, and a rearward portion 168 pivotally secured in any suitable manner at the vertical support elements 162, to move from a first position, such as shown in dashed and dotted lines in FIG. 8, 180° disposed from the first portion 166, to a position as shown in full lines in FIG. 8 at substantially 90° to the first portion 166. The purpose for such pivotal motion will become hereinafter more apparent.

A flexible cover member, indicated generally by the numeral 170 and which may conveniently be formed of a fabric material, is secured in any suitable manner, as at 172, around the upward end of the chute 32. It is not intended that the cover 170 be removed from the chute 32 during the normal operation of the mowing and bagging machine. Also secured to the chute 32 is a latch assembly, indicated generally by the numeral 174, which includes a bracket 176, a latch member 178 pivotally secured in the bracket 176 and movable from a closed to an open position by an operating rod 180. In its latching position, latch member 178 secures the forward peripheral element of the upper frame assembly 164 against the chute 32 to maintain the bag assembly 42' in the position shown in FIG. 7.

The bag 140' is mounted in the bag assembly 42' by folding the open end of the bag 140' around the upper support frame. Cover member 170 is provided with a spring cord or the like in its peripheral edge and is received about the upper frame assembly 164 so that when the bag is installed over the upper frame element 164 the cover member 170 may be stretched over the frame and bag to cover the top opening of the bag 140'. The lower support element 156 supports the bag 140' as it is filled with clippings or sweepings in the usual course of operation.

Figure 2:
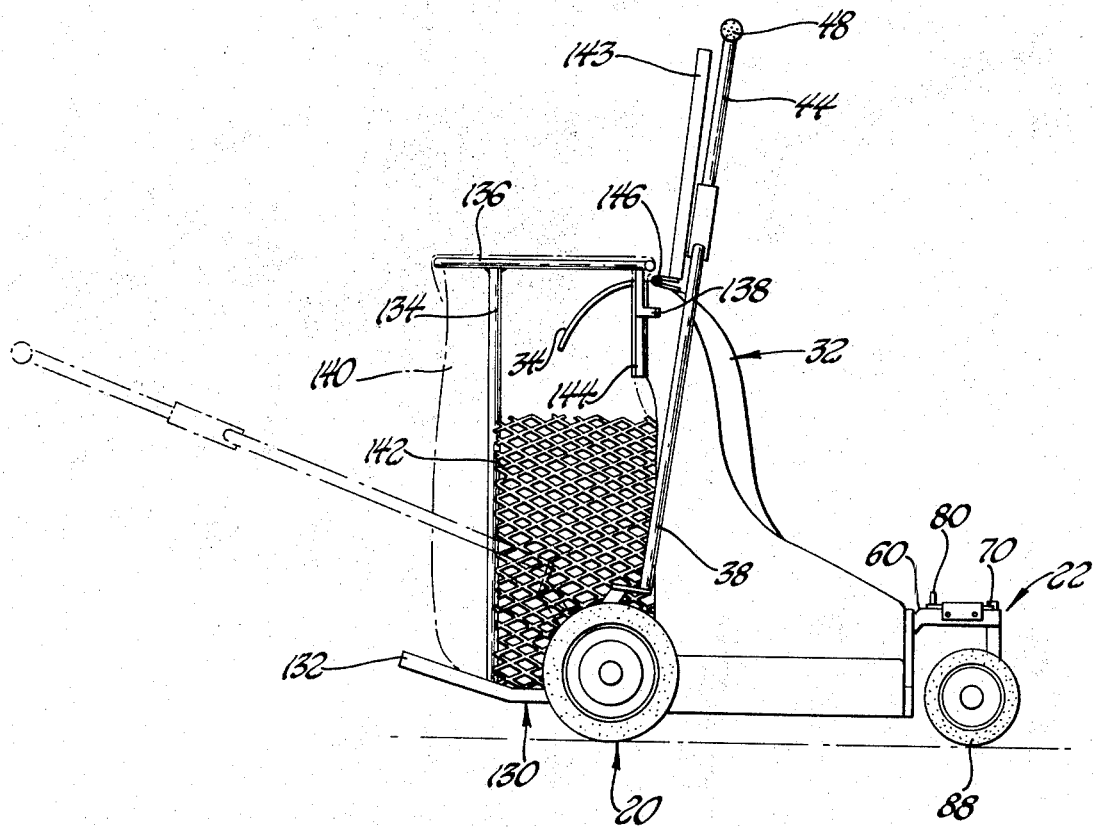
FIG. 2 is a side elevational view of the machine illustrated in FIG. 1.

With either of the bag support assemblies, 42 as illustrated in FIGS. 1 and 2, or 42' as illustrated in FIGS. 7 and 8, it will be readily apparent that there is no obstruction rearwardly of the bag support assemblies or rearwardly of the side support elements 134 and 162 respectively. Without such obstruction, it will be apparent that the filled bag may easily be removed from the bag support assembly 42 or 42' by simply disengaging the open end of the bag from the respective upper frame assembly 136 or 166 and removing the bag rearwardly of the machine. It is obvious that in each instance the cover member, either the cover 143 of FIGS. 1 and 2, or the fabric cover element 170 of FIGS. 7 and 8, must be removed and the handle assembly 36 must be pivoted upwardly and forwardly of the machine to a position such as shown in FIGS. 2 and 8. With the modification shown in FIGS. 7 and 8, the unlatching of the upper frame assembly 164 from the chute 32 permits the assembly 42' to be pivoted downwardly to engagement with the ground and to further ease removal of the bag full of clippings or sweepings rearwardly of the machine, and pivoting the rearward portion 168 of the upper frame assembly 164 upwardly to the 90° position as illustrated in full lines in FIG. 8.

Figure 6:
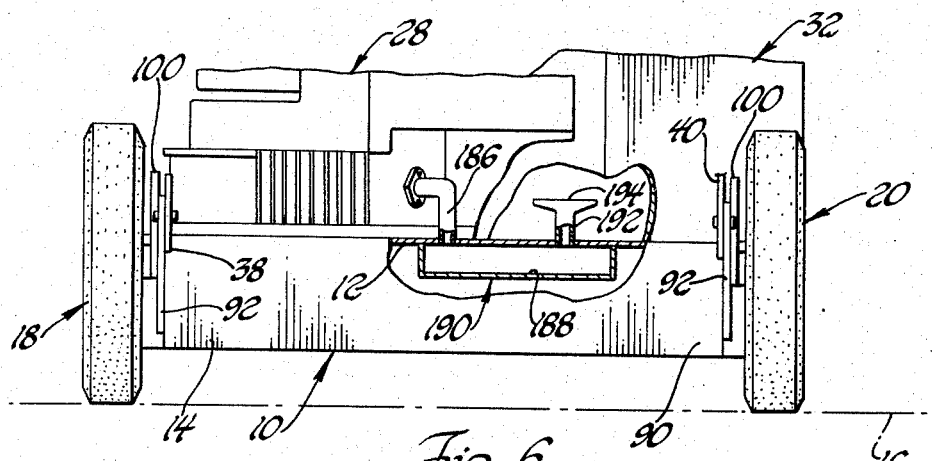
FIG. 6 is a partial rear elevational view of the machine illustrated in FIGS. 1 through 4.

As has been indicated, the typical internal combustion engine, such as engine 28, includes an exhaust pipe indicated in FIG. 6 by the numeral 186. Exhaust pipe 186 is formed to extend through the upper surface 12 of the housing 10 into a chamber 188 formed in a sheet metal housing, indicated generally by the numeral 190 and disposed in the under portion of the housing 10. Sheet metal housing 190 is generally arcuate in shape, as best illustrated in FIG. 4, and extends between the side skirt 14 of the housing 10 and the inner cylindrical ring 56 forming the inner wall of the chute 32 within the housing 10. The exhaust pipe 186 discharges directly into the sheet metal housing 190, which serves as a muffling chamber, and an exhaust conduit 192 extends out of the chamber 188 and is directed into the upwardly extending portion of the chute 32. A nozzle 194 at the end of the conduit 192 increases the velocity of the exhausting gas and provides some assistance to the upwardly directed flow of air through the chute 32. At the same time, the exhausting gases from the chamber 188 and from the engine 28 are dissipated with and mixed with the upwardly flowing cuttings or sweepings picked up by the blade 24, thus disseminating both noise and noxious vapors from the engine 28.

The rearward discharge portion 34 of the chute 32 may be formed of generally box-like cross-section in continuation of the major portion of the chute 32, so that the discharge from the chute is in a downward direction into the bag held in the bag assembly 42 or 42'. Such downward discharge compacts and compresses the cuttings or sweepings within the bag so that a great capacity for collection is provided. Alternatively, the rearward end 34 of the chute 32 may be merely a single wall forming a continuation of the upper surface of the chute 32 to direct the flow of air, clippings and sweepings in a downward direction.

Whether the mowing and bagging machine is hand pushed or power driven, the handle assembly 36 is necessary for steering and directing the machine in the proper course of travel. Handle assembly 36, as heretofore indicated, is pivotally secured to the rearward portion 90 of the housing 10 in any suitable manner so that the operator, by pushing on the handle elements 46 and 48, can push the entire machine forward or pull the machine rearward. The handle assembly 36 is so pivoted as to rise upwardly and forwardly of the machine to permit removal of the bag 140 or 140' from the bag support assembly 42 or 42' as heretofore described.

From the foregoing description it will be apparent that as the machine is used either for mowing or sweeping leaves, the cutter blade 24 will cut or sweep as required and create an air flow upwardly through the chute assembly 32. With the bag properly located and supported, the sweepings or clippings will be discharged and compacted in the bag as the machine is operated over the ground. The four wheels, in the substantially three-point location, provide great maneuverability of the machine, the forward caster wheel assembly 22 permitting the forward part of the machine to be maneuvered in any direction. The location of the rearward wheels inwardly of the outside vertical planes of the housing 10 permit the machine to be moved very close to obstructions for proper and efficient mowing. The over-all result is a mowing and bagging machine of great versatility, economy, and efficiency and which permits simple and safe removal of the collection bag as necessary. Adjustment of the cutting or sweeping height is easily obtained and simply accomplished, and the exhaust treatment from the engine reduces noise and pollution to a much greater degree than obtainable in presently known machines.

What is claimed is:

1. A mowing and bagging machine comprising:
    a generally circular housing having a downwardly directed skirt; spaced wheel means secured to said housing for supporting said housing and permitting traverse thereof over the ground;
    an engine mounted on said housing and having a shaft extending therethrough and generally centrally thereof, said engine having an exhaust pipe;
    a rotating blade mounted on said shaft and rotatable within said housing;
    a chute forming the upper surface of said housing about said engine and curling around said engine and upwardly and rearwardly of said housing, said chute having an upward and rearward terminus having means thereon for deflecting material downwardly therefrom;
    a bag support assembly mounted rearwardly on said housing and having a lower platform and upwardly extending side elements and an upper frame, said upper frame being securable to said chute and to said side elements;
    a bag removably secured to said upper frame and located to receive discharge from said chute, said bag being supported by said bag support assembly and removable rearwardly therefrom upon disenagement from said upper frame;
    and handle means pivotally secured to said housing and having a pushing position, said handle being pivotable from said pushing position forwardly and over said bag support assembly to permit rearward removal of said bag.

2. The mowing and bagging machine set forth in claim 1 wherein said wheel means includes an adjustable caster wheel assembly mounted forwardly on said housing and having spaced wheels on an axle.

3. The mowing and bagging machine set forth in claim 2 wherein said caster wheel assembly further includes a bracket member secured at one end to said housing and extending outwardly therefrom, a sleeve mounted on the outer end of said bracket member, a shaft secured to said axle and extending through said sleeve, said shaft being slidable and rotatable in said sleeve and having a plurality of annular grooves formed therein, and a member slidably mounted on said bracket and extendable into one of said annular grooves on said shaft to secure said shaft relative to said sleeve and relative to the ground, said member being slidable out of engagement with said shaft to permit slidable adjustment of said shaft relative to said sleeve and the ground.

4. The mowing and bagging machine set forth in claim 2 wherein said wheel means further include spaced wheels mounted rearwardly of said housing and on opposite sides thereof, the outer vertical plane of each of said wheels being inward of the outermost vertical planes of said housing.

5. The mowing and bagging machine set forth in claim 4 wherein said spaced rear wheels include adjustment means in the axles thereof for adjusting the height of said housing relative to said wheels.

6. The mowing and bagging machine set forth in claim 5 wherein said housing at each side thereof includes a plurality of spaced apertures, each of said apertures being at the same distance from a point, and said adjustment means includes a plate at each side of said housing pivotally mounted on said housing at said point, each of said axles being secured to one of said plates and being pivotable therewith about said point, and a pin extending through each of said axles and through said plates and into an aperture in said housing, said pins being spring-biased toward said housing and withdrawable in said axles and out of said aperture for adjustment of said axles and said wheels relative to said housing.

7. The mowing and bagging machine set forth in claim 1 wherein said wheel means include four spaced wheels, two of said wheels being adjustably mounted rearwardly of said housing and inwardly of the vertical side planes of said housing, and the other two of said wheels being adjustably mounted for vertical movement and pivoted movement forwardly of said housing.

8. The mowing and bagging machine set forth in claim 1 and further including a chamber in said housing and adjacent said engine, said exhaust pipe from said engine being located to discharge into said chamber, and outlet means from said chamber to said chute for discharging exhaust gases from said chamber into said chute.

9. The mowing and bagging machine set forth in claim 8 wherein said outlet means from said chute includes a nozzle disposed in said chute and directing exhaust gases upwardly of said chute.

10. The mowing and bagging machine set forth in claim 9 wherein said chamber is disposed beneath the upper surface of said housing.

11. The mowing and bagging machine set forth in claim 1 wherein said bag support assembly further includes a cover receivable over the rearward terminus of said chute and over said upper frame.

12. The mowing and bagging machine set forth in claim 11 wherein said cover is hingedly secured to said chute.

13. The mowing and bagging machine set forth in claim 11 wherein said cover is of a fabric material and is secured around said chute, and further including resilient means in said cover for removably securing said cover around said upper frame.

14. The mowing and bagging machine set forth in claim 11 wherein said bag support assembly is pivotally mounted on said housing for movement from an upper position adapted to support said bag to a downward position permitting rearward unloading of said bag.

15. The mowing and bagging machine set forth in claim 14 and further including latch means secured to said chute and engageable with said bag support assembly for latching said bag support assembly in said upper position and releasable to permit said bag assembly to be moved to said downward position.

16. The mowing and bagging machine set forth in claim 11 wherein a rearward portion of said upper frame is hingedly connected to the remaining portion of said upper frame, said rearward portion being movable to an upper position to permit location of said bag over said rearward portion and said remaining portion and movable to a downward position to tighten and secure said bag in said upper frame.

17. The mowing and bagging machine set forth in claim 11 wherein said upper frame of said bag support assembly is secured to said chute.

18. The mowing and bagging machine set forth in claim 17 wherein the perimeter of said upper frame plus twice the vertical distance from said upper frame to the bottom of said chute plus the lateral dimension of said chute substantially equals the dimension of the opening of said bag.

19. The mowing and bagging machine set forth in claim 17 wherein the opening dimension of said bag is sufficient to permit mounting of said bag under said chute and upwardly to said upper frame and around said upper frame, said bag being foldable over said upper frame to retain said bag in place in said bag support assembly.

20. The mowing and bagging machine set forth in claim 1 wherein said bag is of a debris retaining air porous material.

21. In a mowing and bagging machine having a wheeled housing and a downwardly discharging chute, a bag support assembly comprising:
 a bag support member secured to said housing and extending rearwardly and upwardly therefrom;
 side elements secured to said support member and extending upwardly therefrom;
 a generally rectangular upper frame secured to said side elements and to said machine, said frame having an opening therein adjacent said chute and substantially the width of said chute, said upper frame being located with said opening above said chute;

said upper frame having a perimeter dimension substantially equal to the circumference of a bag minus the width and minus twice the height of said chute;
 whereby a bag is entrained around the lower surface and the two side surfaces of said chute and through said opening in said upper frame and around said upper frame to retain the bag on said frame to receive discharge from said chute.

22. The bag support assembly set forth in claim 21 and further including a cover member hingedly secured to said machine and covering said upper frame and the discharge end of said chute.

23. The bag support assembly set forth in claim 22 and further including side and forward wall means secured to said side elements and to said support member without obstruction rearwardly of said side elements for supporting said bag.

24. In a mowing and bagging machine having a wheeled housing and a downwardly discharging chute, a bag support assembly comprising:
- a generally rectangular base frame pivotally secured to said housing and extending rearwardly therefrom, said frame having an upward bag support position and a downward bag discharge position;
- a bag support member secured to said base frame and moveable therewith and extending to said housing and engaging the rearward portion thereof;
- spaced side elements secured to said base frame and extending upwardly therefrom;
- a generally rectangular upper frame secured to said side elements, said upper frame having a first peripheral portion pivotally secured about an axis to a second peripheral portion, and said first portion having one position 90° disposed about said axis relative to said second portion for installation or removal of a bag and another position 180° disposed about said axis relative to said second portion to tighten and secure said upper frame within the opening of a bag;
- a cover secured to the discharge end of said chute and extending over said upper frame, said cover having resilient means therein for securing said cover about said upper frame;
- and latch means on said machine and removably securing said upper frame when said base frame is in said upward bag support position and releasable to permit said base frame and said side elements and said upper frame to move as a unit to said second position of said base frame and permit rearward discharge of a bag from said bag support assembly.

25. In a mowing and bagging machine having a housing and rear wheels, wheel adjusting and support means comprising:
- a plate member secured to each side of said housing and rearwardly thereof, each of said plate members having a plurality of apertures therein disposed in spaced relation on an arc about a point on said plate;
- an axle assembly at each side of said housing, each axle assembly including a plate portion and an axle shaft extending outwardly therefrom, said plate portion being pivotally secured to said plate member at said point and being rotatable therearound;
- a pin extending through each of said axle assemblies, each of said pins extending through said axle shaft and said plate portion and into one of said apertures in said plate member to locate said axle assembly relative to said housing;
- a spring engaging each of said pins and each of said axle assemblies and biasing each of said pins into said apertures, said pins being slidable in said axle assemblies against said springs to permit disengagement of said pins from first apertures in said plate members and rotation of said axle assemblies about said point and re-engagement of said pins in other apertures in said plate member;
- and a wheel rotatably mounted on each of said axle shafts.

* * * * *

UNITED STATES PATENT OFFICE
CERTIFICATE OF CORRECTION

Patent No. 3,802,173     Dated April 9, 1974

Inventor(s) Eric J. Opitz

It is certified that error appears in the above-identified patent and that said Letters Patent are hereby corrected as shown below:

The inventor's address should read
-- 31280 Ramble Road, Franklin, Michigan 48025 --.

Signed and sealed this 24th day of September 1974.

(SEL)
Attest:

McCOY M. GIBSON JR.
Attesting Officer

C. MARSHALL DANN
Commissioner of Patents